Feb. 5, 1929.                                                          1,701,472
R. P. DINSMORE
METHOD OF SHAPING FABRIC BANDS
Filed May 23, 1925
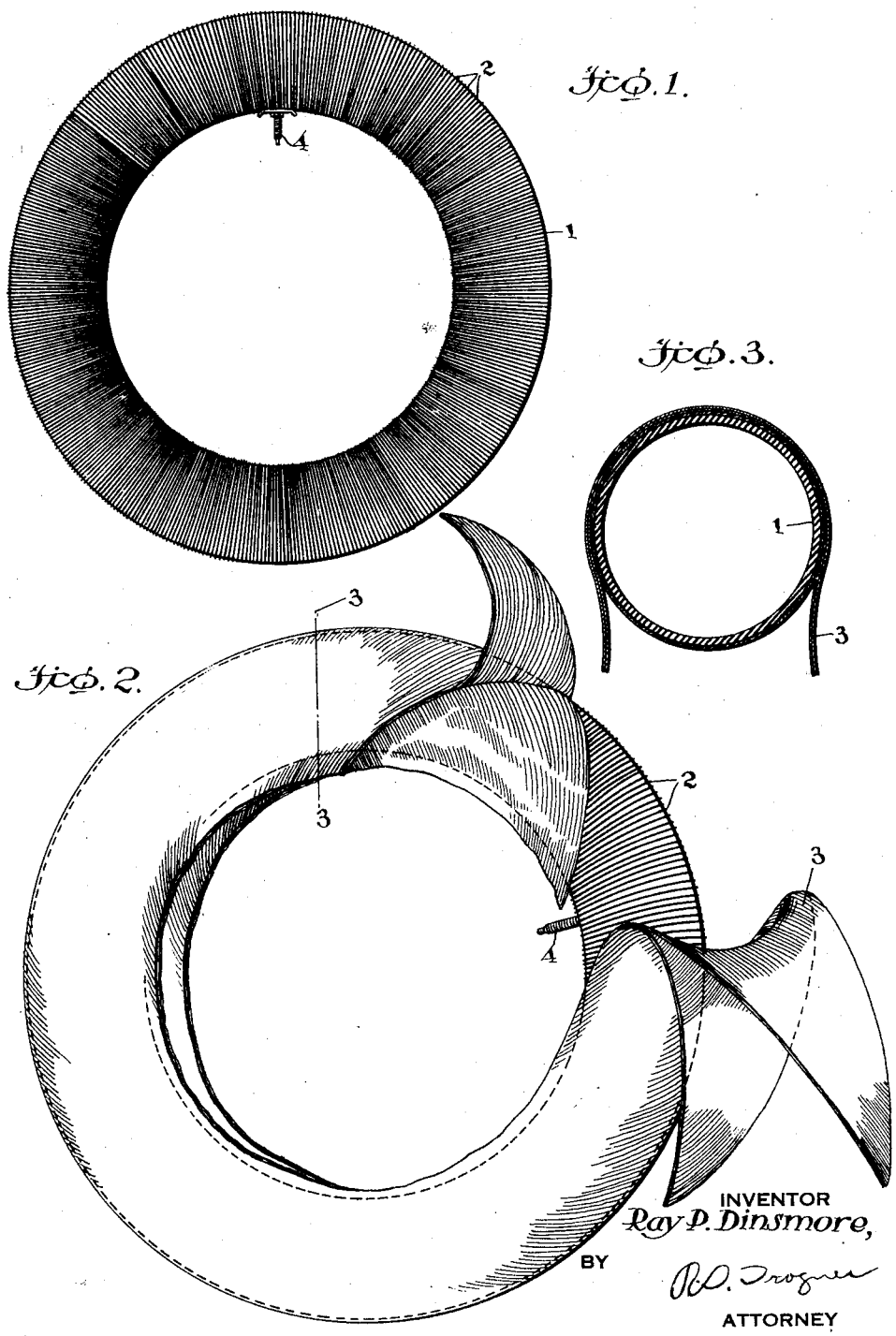
INVENTOR
Ray P. Dinsmore,
BY
ATTORNEY Patented Feb. 5, 1929.

1,701,472

UNITED STATES PATENT OFFICE.

RAY P. DINSMORE, OF AKRON, OHIO, ASSIGNOR TO THE GOODYEAR TIRE & RUBBER COMPANY, OF AKRON, OHIO, A CORPORATION OF OHIO.

METHOD OF SHAPING FABRIC BANDS.

Application filed May 23, 1925. Serial No. 32,402.

My invention relates to pneumatic tire manufacture and it is particularly related to the shaping of fabric bands which are to be assembled to form tire carcasses.

The object of my invention is to provide a method and device for shaping a ply prior to its incorporation to form a tire carcass.

In order to reinforce pneumatic tires it has been customary to incorporate a fabric structure or carcass which is made integrally with the vulcanized product. According to the present methods, a tire band is stretched about a suitable mandrel and shaped thereon by varied stitching processes. It is obvious that this necessitates stretching the band in order to surround the greater circumference of the core or mandrel. On the other hand, considerable excess fabric must be cared for near the bead portions. The former difficulty often involves a distortion or spreading of the cords, whereas the latter causes a wrinkled bead portion which results in local weaknesses and strained portions.

Several attempts have been made to obviate these difficulties. Each involves practically the same principle, namely, passing the band about a small pulley while under tension. The pulley employed usually engages only the central portion of the strip. While this device does stretch the central portion, it possesses several marked defects. One of these lies in the fact that it provides practically no control whereby the amount of stretch may be varied at will. In addition, the end portions are never stretched, accordingly a section of the carcass will lack the benefits to which it is entitled.

According to my invention, I have provided means whereby a band may be expanded under positive control. Moreover, the distortion produced thereby coincides with the periphery of a transverse section of the core upon which it will be applied.

In the accompanying drawings:

Fig. 1 is a plan view of an expansible core employed in practicing my invention;

Fig. 2 is a similar view illustrating a shaped band in the process of being removed from the core; and Fig. 3 is a transverse section of the core taken on line 3—3 of Fig. 2.

The expansible core embodies an elastic tube 1 around which is wound a cord 2, in a manner illustrated. The core may include a rubber casing of a type not unlike that commonly employed in the manufacture of inner tubes or pneumatic tires.

In practicing my invention, a band 3 is centrally adjusted upon the core. The band 3 may comprise one or more plies of prepared rubberized fabric, such as commonly employed in the manufacture of tire casings. A pressure fluid, such for example as air, is admitted into the tube, through a conventional valve 4, thereby causing it to expand. It is to be noted that the expansion will take place in but one direction, inasmuch as the cords which have been wound about the transverse circumference are substantially inelastic. In other words, the area of the transverse section, as illustrated in Fig. 3, will be substantially constant at all times and any increase in volume of the tube must be effected by an increase of the circumference of the core. The degree of expansion may be varied in accordance with the requirements. After the stretching operation has been completed, the core is collapsed by allowing the fluid contained therein to escape. The fabric band may either be removed as an annulus from the deflated core or it may be torn and stripped from the inflated core in a manner illustrated in Fig. 2. Since the cords in one ply of the band run at an angle of approximately 90° with respect to those in the other ply, and since the fabric tears along the cords, the ends of the fabric have a V or fish-tail shape which may be readily spliced after the band is removed from the tube. A band so shaped may be applied to a tire building core in the usual manner.

It is advisable, of course, to suppress any adhesive tendencies of the expansible core by any well-known means in order that the shaped band will not be distorted in removing it therefrom.

It will be obvious to anyone skilled in the art that my invention provides an ideal expanding means, inasmuch as the core upon which it is shaped may coincide exactly with the tire mandrel. Moreover, the expansion is uniform coincident with the distortion required to effect the best results. The operation is extremely simple and may be practised without mechanical difficulties.

Although I have described but a single expanding device, it is obvious that the invention set forth may be subjected to many wide variations without departing from the principles thereof and I desire, therefore, that it shall be limited only in accordance with the appended claims.

What I claim is:

1. A method of shaping cord fabric bands which comprises placing a band upon a circumferentially expansible circular form, expanding the latter to shape the band, then tearing the fabric of the band diagonally and stripping it from the form.

2. A method of shaping fabric bands which comprises placing a cord fabric band upon a circumferentially expansible tube, expanding the latter to shape the band, then tearing the fabric sheets of the band diagonally, and stripping the band from the tube.

In witness whereof, I have hereunto signed my name.

RAY P. DINSMORE.